United States Patent [19]
Kobayashi

[11] Patent Number: 5,615,250
[45] Date of Patent: Mar. 25, 1997

[54] PORTABLE TELEPHONE SET FOR USE WITH IC CARD

[75] Inventor: Fumiyuki Kobayashi, Tokyo, Japan

[73] Assignee: NEC Corporation, Japan

[21] Appl. No.: 671,830

[22] Filed: Jun. 25, 1996

Related U.S. Application Data

[63] Continuation of Ser. No. 276,714, Jul. 18, 1994, abandoned.

[30] Foreign Application Priority Data

Jul. 23, 1993 [JP] Japan ................................. 5-202073

[51] Int. Cl.⁶ ........................................... H04Q 7/32
[52] U.S. Cl. ................... 379/61; 379/357; 455/90
[58] Field of Search ........................... 379/61, 58, 357,
379/447, 446; 455/89, 90, 127, 343; 257/679;
D14/142, 138

[56] References Cited

U.S. PATENT DOCUMENTS 5,257,414  10/1993  Trahan et al. ............................ 455/90

FOREIGN PATENT DOCUMENTS

| | | |
|---|---|---|
| 0276403 | 11/1987 | European Pat. Off. . |
| 0505931 | 3/1992 | European Pat. Off. . |
| 0505932 | 3/1992 | European Pat. Off. . |
| 1-160523 | 11/1989 | Japan . |
| 4-48309 | 8/1992 | Japan . |
| 5-9057 | 2/1993 | Japan . |
| 6-162279 | 6/1994 | Japan . |

OTHER PUBLICATIONS

Translation of EP 0 505 931 A2, Petersen Sep. 30, 1992.

*Primary Examiner*—Curtis Kuntz
*Assistant Examiner*—Michael B. Chernoff
*Attorney, Agent, or Firm*—Ostrolenk, Faber, Gerb & Soffen, LLP

[57] ABSTRACT

A portable telephone set includes a main section thereof, an IC card, and a battery pack, which are removably connected to each other. The battery pack has an L-shaped rib to provide a slot in which the IC card is inserted. When the IC card is inserted in the slot, a side surface of the IC card is brought into contact with a side surface of the battery pack to be held therein in a unified form. In the combined state, a hook section of the battery pack is engaged with an engaging section of the main section. When the battery pack is pushed downward, a depressed portion of the battery pack is engaged with a lock member of the main section so as to fixedly attach the battery pack onto the main section. The IC card is pushed by the battery pack to be brought into contact with a connector of the main section so as to establish a stable connection therebetween. There is provided a small-sized, low-cost portable telephone set having improved operability of IC card installation and removal.

1 Claim, 4 Drawing Sheets

PORTABLE TELEPHONE SET FOR USE WITH IC CARD

This is a Continuation of application Ser. No. 08/276,714 filed on Jul. 18, 1994, now abandoned.

BACKGROUND OF THE INVENTION

The present invention relates to a portable telephone set, and in particular, to a portable telephone set including a battery pack and IC card mounting section in which a battery pack and an IC card is installed when the telephone set is in operation.

DESCRIPTION OF THE RELATED ART

Conventionally, to expand functions and to guarantee flexibility of the functions while retaining portability, there have been proposed various portable and car-mount-type telephone sets using an IC card. As well known, the IC card has satisfactory characteristics, namely, the IC card has a small size, a light weight, a mechanical strength, resistibility against environmental influences, etc. In general, the IC card is removably installed in the telephone set for effective utilization of the characteristics. This is also the case with the IC card adopted in the portable telephone set and hence operability of the IC card mounting mechanism is essential performance of the portable telephone set.

FIG. 1 is a cross-sectional view for explaining an IC card installing mechanism of a conventional portable telephone set. In FIG. 1, a main section of portable telephone set 101 includes a section for accommodating therein an IC card 102. With the IC card installed in the section, a battery pack 103 is mounted on the IC card 102 in the main section 101 to be fixedly held therein. The IC card 102 has a connecting terminal to be linked with a connector 104 provided in the card accommodating section of the main section 101. The connector 104 is energized to be pushed against the IC card side to guarantee stability of the connection. When the battery pack 103 is removed therefrom, the IC card 102 is moved upward by a pushing force of the connector 104, which facilitates removal of the IC card 102 (reference is to be made to Japanese Utility-Model Laid-Open Publication No. 5-9057).

In addition, there has been proposed a configuration in which the main section of the telephone set has an opening to insert an IC card therein such that the opening is surrounded by the battery pack with the IC card inserted therein (Japanese Utility-Model Laid-Open Publication No. 1-160523).

Moreover, there have been proposed, for example, structure in which the main section of the telephone set has a bottom portion provided with a slit-shaped opening to insert an IC card therein, constitution in which the main section has a portion including a rotable IC card accommodating section, or a configuration including an openable and closable cover such that the cover is opened to install an IC card therein (reference is made to Japanese Patent Publication No. 4-48309).

However, it has been required to reduce the size and weight of portable telephone sets for better portability thereof. To this end, for the configuration of conventional portable telephone sets, there is necessitated to dispose a particular mechanism, for example, a button to remove the IC card therefrom, which is disadvantageous for reduction of the size, weight, and cost.

In the structure shown in FIG. 1, when the battery pack is removed from the main section 101, the IC card 102 is exposed to the external space and is likely to be easily released therefrom. Consequently, it may possibly occur when replacing the battery pack that the IC card 102 falls off to be lost or destroyed. Particularly, when the user is carrying the portable telephone set, the battery pack replacement is effected in a state where feet and hands of the user are not satisfactorily stable to replace the battery pack, and hence there may easily occur the above trouble. It is therefore quite important to improve efficiency of operability of the portable telephone set.

SUMMARY OF THE INVENTION

It is therefore an object of the present invention to provide a small-sized, low-cost portable telephone set having improved operability of installation and removal of an IC card.

To achieve the object in accordance with the present invention, there is provided a portable telephone set in which a battery pack and an IC card can be attached onto a main section thereof, the battery pack including IC card holding means for holding the IC card. The battery pack with the IC card held by the holding means is mounted in a unified form onto the main section.

Furthermore, the IC card holding means includes a slot disposed on a side surface of the battery pack on the battery pack mounting side. It is favorable that IC card is inserted into the slot with a side surface of the IC card being brought into contact with a side surface of the battery pack on the mounting side thereof.

Moreover, the portable telephone set desirably includes a first connector on a side surface of the main section on the IC card mounting side and a second connector on another side of the IC card such that the electric connection is established between the first connector and the second connector by installing the battery pack with the IC card held therein in the portable telephone set.

In this regard, the first connector favorably includes a connector terminal ejecting from a side surface of the main section on the IC card mounting side and being energized toward the IC card side.

There is provided in accordance with the present invention a method of connecting an IC card to a portable telephone set in which a battery pack and an IC card can be attached onto a main section thereof, comprising the steps of holding the IC card in the battery pack, and mounting the battery pack with the IC card held by the holding means in a unified form onto the main section. The IC card is connectible to the main section by mounting the battery pack onto the main section.

Furthermore, the IC card holding step desirably includes the steps of inserting the IC card to a slot disposed on a side surface of the mounting side of the battery pack, and bringing a side surface of the IC card into contact with the side surface of the mounting side of the battery pack, thereby holding the IC card.

Moreover, there are favorably further included the steps of disposing a first connector on a side surface of the main section on the IC card mounting side and a second connector on another side of the IC card, and installing the battery pack with the IC card held therein in the portable telephone set, thereby establishing the electric connection between the first connector and the second connector.

In consequence, according to an essential aspect of the portable telephone set of the present invention or according to the method of connecting an IC card to the portable telephone set of the present invention, the IC card is held by a battery pack such that the battery pack thus holding the IC card is mounted on the main section of the portable telephone set. This enables the IC card to be electrically connected to the portable telephone set.

BRIEF DESCRIPTION OF THE DRAWINGS

The objects and features of the present invention will become more apparent from the consideration of the following detailed description taken in conjunction with the accompanying drawings wherein.

DESCRIPTION OF THE PREFERRED EMBODIMENT

Referring now to the accompanying drawings, description will be given of an embodiment of a portable telephone set in accordance with the present invention.

Figure 1:
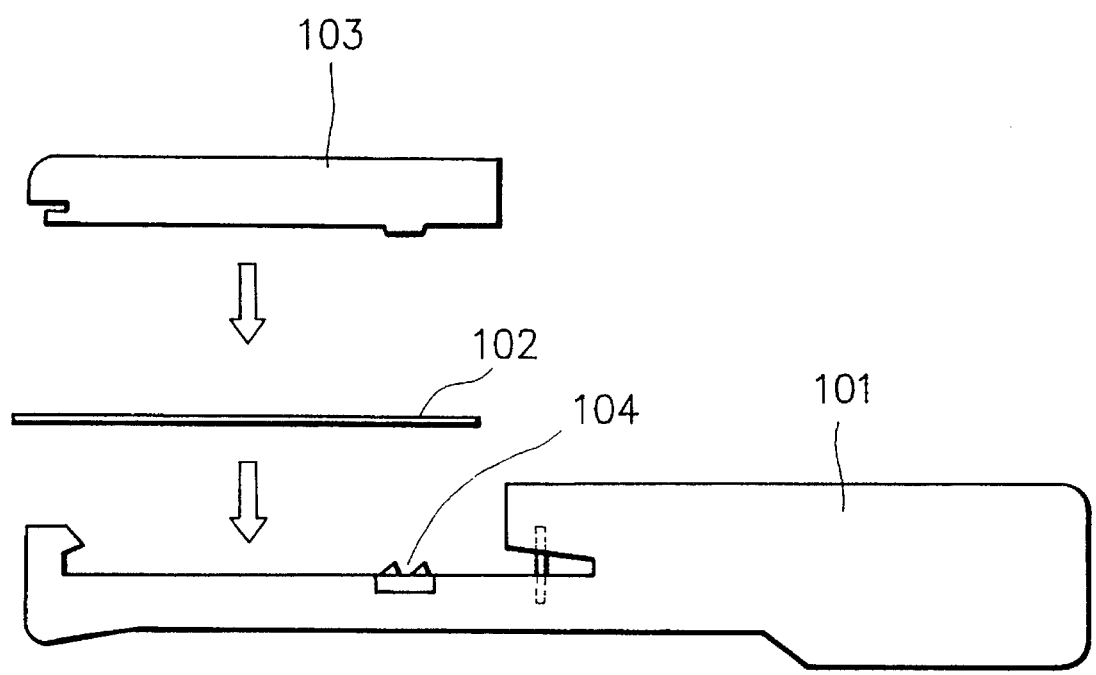
FIG. 1 is a cross-sectional view for explaining an IC card installing mechanism of a conventional portable telephone set.
Figure 2:
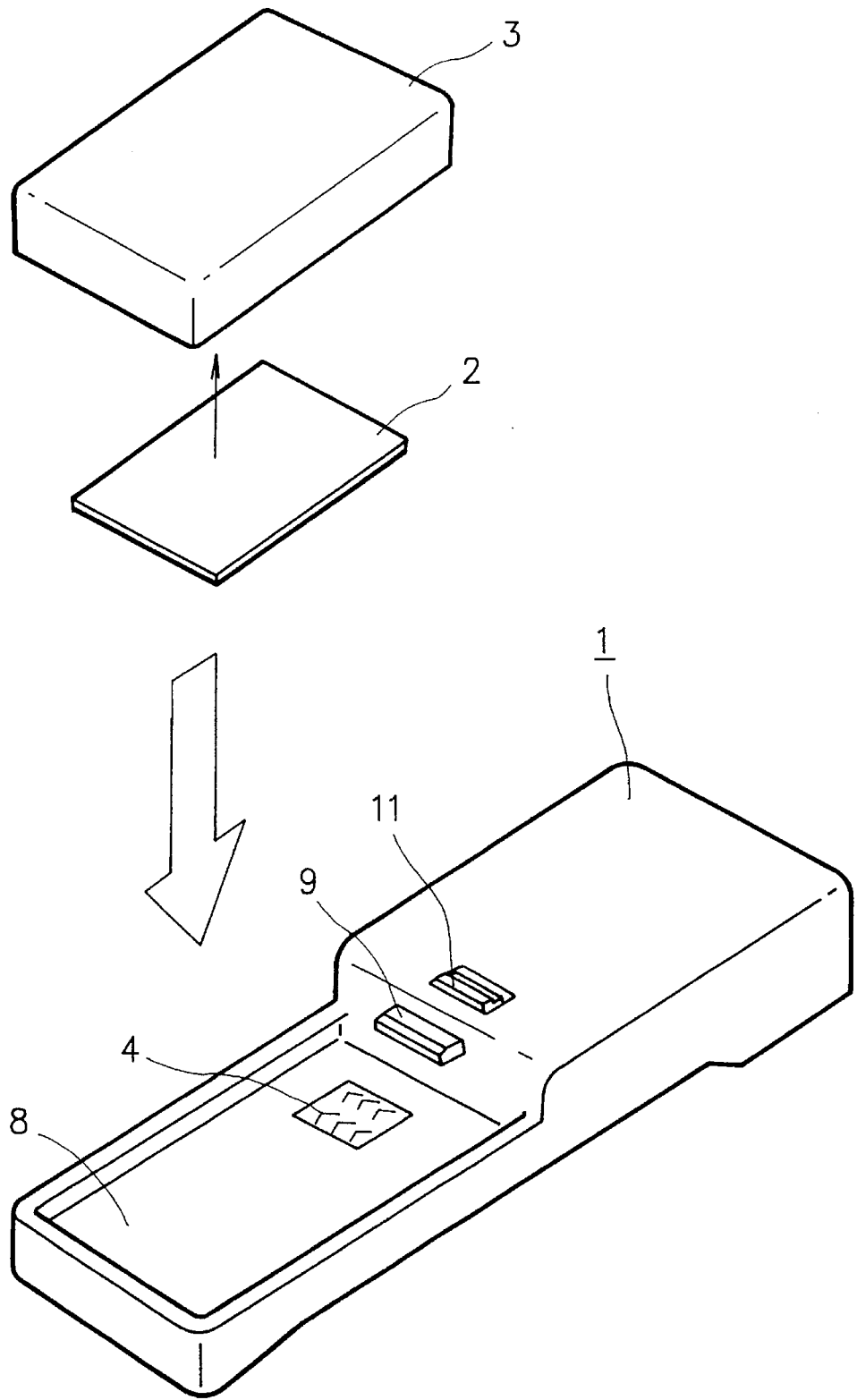
FIG. 2 is a perspective view schematically showing the configuration of the embodiment in accordance with the present invention.
Figure 3:
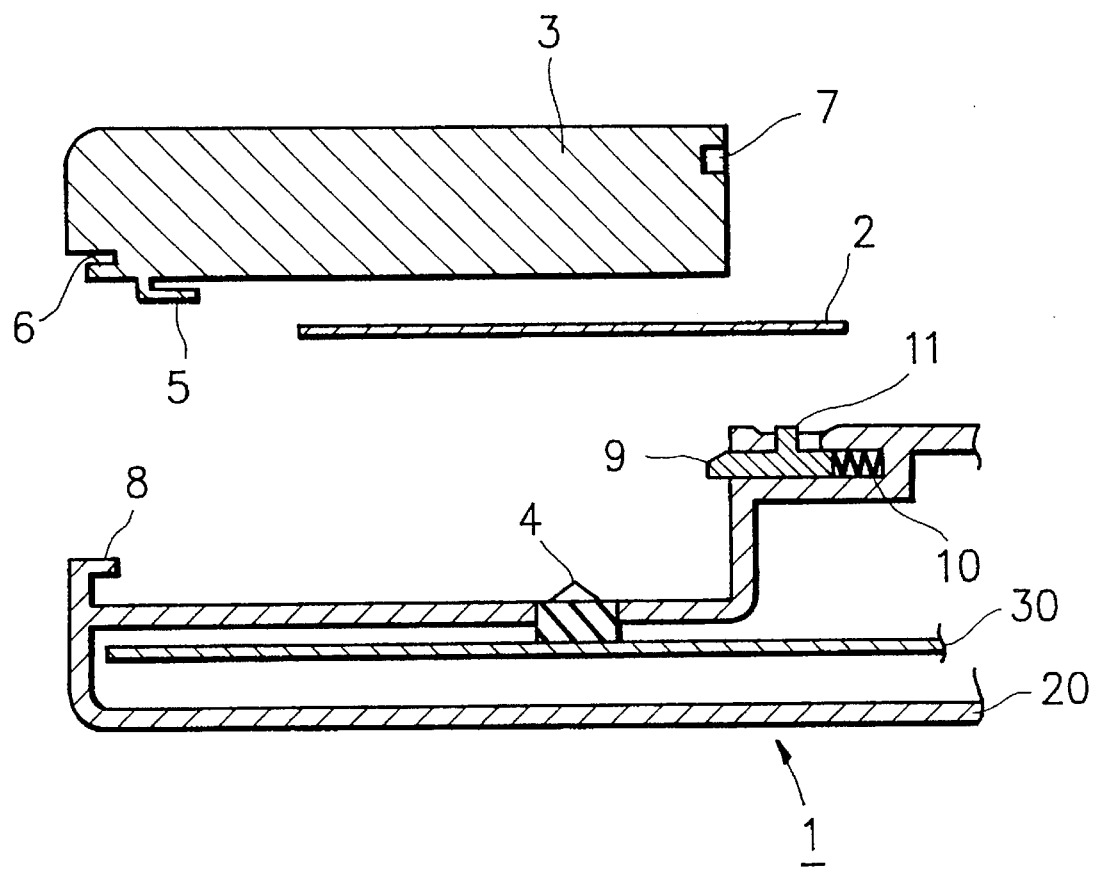
FIG. 3 is a magnified cross-sectional view illustratively showing an IC card mounting section of the embodiment of FIG. 2.
Figure 4:
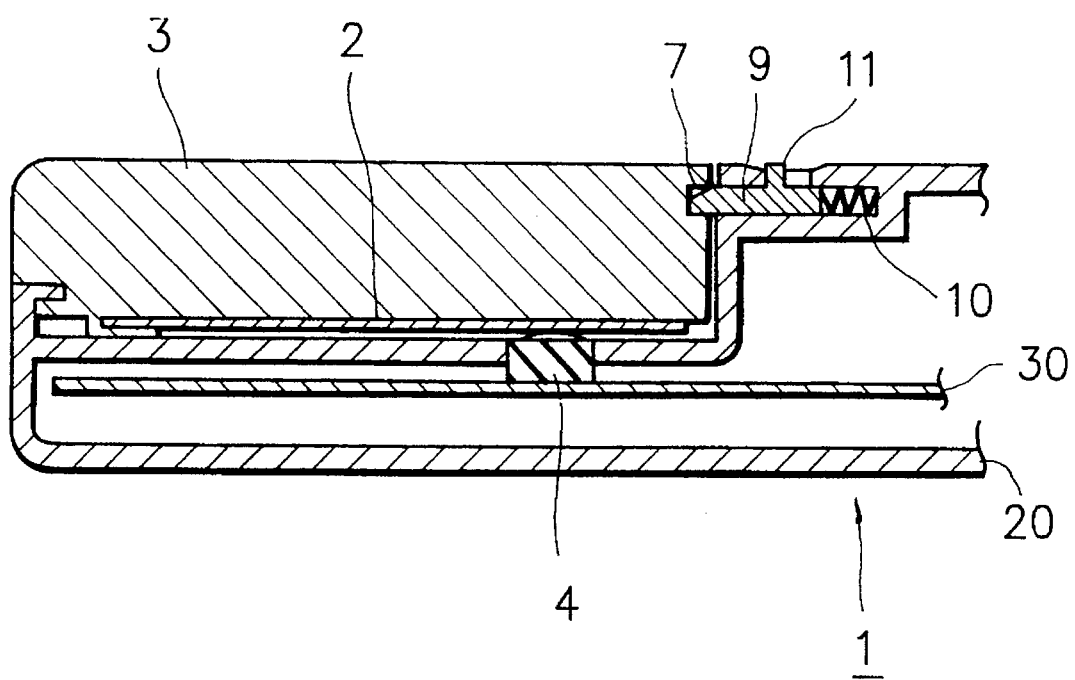
FIG. 4 is a cross-sectional view schematically showing a state in which the IC card is installed in the IC card mounting section of FIG. 3.

FIGS. 2 to 4 collectively show an embodiment of a portable telephone set in accordance with the present invention.

FIG. 2 is a perspective view of appearance of the embodiment for explaining the constitution of the embodiment.

FIG. 3 is a cross-sectional view showing structure of an IC mounting section of the embodiment. In addition, FIG. 4 shows in a cross-sectional view a state in which the IC card is mounted onto the IC mounting section.

The portable telephone set of the embodiment includes three primary components, namely, a main section of portable telephone set 1, an IC card 2, and a battery pack 3. These constituent sections are removably mounted on each other, specifically, FIG. 2 shows a manner in which the respective sections are connected to each other, FIG. 3 presents structural features related to the connections therebetween, and FIG. 4 demonstrates a state in which these elements are linked with each other.

The main section 1 is a body of portable telephone set and includes a casing 20, a circuit section 30, and other sections, not shown, such as an antenna, and an operator's panel section. The main section 1 is removably coupled with the IC card 2 and the battery pack 3 as described above. To implement the connecting function, the casing 20 includes a first connector 4 to be electrically linked with a second connector, not shown, of the IC card 2, a hook section 8 to retain or to hold the battery pack 3, and a lock member 9, a coiled spring 10, and a knob 11 to mount and to release the battery pack 3 in and from the casing 20, respectively.

The connector 4 is provided in the IC card and battery pack mounting section of the main section 1 to be exposed to the external space. To establish a stable electric connection between the connector 4 and the IC card 2, the connector 4 is energized to be pushed toward the IC card 2 by a pushing force of a spring, not shown. Moreover, the connector 4 is electrically coupled with the circuit section 30.

The lock member 9, the coiled spring 10, and the knob 11 constitute a mechanism to removably mount the battery pack 3 onto the main section 1. The lock member 9 and the coiled spring 10 are manufactured as an integrated unit, for example, with a resin and includes an end portion having a tapered upper surface. The lock member 9 is slidably inserted into a gap disposed in the casing 20. Inserted into the gap is also the coiled spring 10 such that the lock member 9 is energized or pushed toward the outside of the casing 20 by a spring force of the coiled spring 10.

In a natural state of the configuration, an end portion of the lock member 9 projects from an end surface of the casing 20. When the lock member 9 is slid toward the coiled spring 10 and is kept remained in the moved state, the end portion thereof is retracted to a position in the gap of the casing 20, namely, the end portion is not projected from the end surface of the casing 20. Moreover, the lock member 9 in the natural state is energized toward the battery pack 3 by the coiled spring 10 and hence the extruded end portion of the lock member 9 engages with a depressed portion 7 of the battery pack 3 to fixedly hold the pack 3 therein. The fixed state can be released by operation of the knob 11.

The IC card 2 is an additional circuit section, for example, to modify or to expand the contents of functions of the portable telephone set. The contents of functions are, for example, a circuit section for modem communication and a memory to temporarily store therein the contents of telephone calls. The circuit section of the IC card 2 is electrically connected via the connector 4 to the circuit section 30 of the main section 1. The electric connection between the IC card 2 and the connector 4 is retained by a pushing force of a spring, not shown.

The battery pack 3 is a power source to supply electric power to be consumed by the portable telephone set. The battery pack 3 includes a primary or secondary battery configured in a cassette form. Referring to the cross-sectional constitution of the battery pack 3 shown in FIG. 3, there are included in a bottom portion thereof an L-shaped rib 5 and a hook section 6 to be engaged with the engaging section 8 of the casing 20 and a depressed section 7 in a side surface thereof into which the end portion of the lock member 9 is to be inserted.

The L-shaped rib 5 is provided in a side surface of the battery pack 3, the side surface being used to install the battery pack 3 in the main section 1. On the side surface, the rib 5 is formed to provide a bag-shape slot therein such that the IC card 2 is inserted in the slot. When the IC card 2 is inserted therein, a side surface of the IC card 2 is brought into contact with a side surface of the battery pack 3 to be held by the L-shaped rib 5, thereby combining the IC card 2 with the battery pack 8. On another surface of the IC card 2, there is provided a connector, not shown. When the battery pack 3 is installed in the main section 1, the connector is brought into contact with the connector 4 of the main section 1, thereby establishing an electric connection therebetween.

In the above structure, the main section 1, the IC card 2, and the battery pack 8 are thus linked with each other into an assembled state shown in FIG. 4. In the combined state, the main section 1 is powered by the battery pack 3 such that the supplied power is consumed by the main section 1 and the IC card 2.

To mount the IC card 2 onto the main section 1, the IC card 2 is first inserted into the slot provided by the rib 5 of the battery pack 3 such that the IC card 2 and the battery pack 3 are mechanically fixed to an integrated state. Subsequently, the hook section 6 of the battery pack 3 integrally combined with the IC card 2 is engaged with the engaging section 8 of the main section 1 and then the battery pack 3 is downwardly pushed. Resultantly, the lock member 9 is retracted and then the depression 7 of the battery pack 3 engages with the lock member so as to fixedly attach the battery pack 3 onto the main section 1. Since the lock member 9 is biased in the ejecting direction by the spring 10, the end portion of the lock member 9 pushes the depression 7 of the battery pack 3, thereby fixedly retaining the battery pack 3 in the main section.

In addition, the IC card 2 has a connector section, not shown, to be pushed by the connector 4 so as to guarantee an electric connection therebetween. In this manner, the battery pack 3 combined with the IC card 2 is installed in the main section 1 as shown in FIG. 4.

To remove the IC card 2 from the main section 1, it is only necessary to operate the release knob 11 to retract the lock member 9 so as to remove the battery pack 3 from the main section 1. Since the IC card 2 is integrally combined with the battery pack 3, the IC card 2 is resultantly removed from the main section 1 without fear of removal of the IC card 2 from the battery pack 3. Prior to replacement of the IC card 2, for example, to protect the IC card against electric disturbance and to prevent erroneous operation of the portable telephone set, the power supply is turned off in general. Thanks to the united form-of the battery pack 3 and the IC card 2, the protective and preventive operations can be always simultaneously accomplished when replacing the IC card 2.

In this regard, although the embodiment is a suitable example of the present invention, the present invention is not restricted by the embodiment.

As can be understood from the above description, according to the essential aspect of the portable telephone set of the present invention or according to the method of connecting an IC card to a portable telephone set of the present invention, the IC card is held by a battery pack such that the battery pack with the IC card held therein is mounted onto a main section of the portable telephone set. Thanks to the mounting operation, there is established an electric connection between the IC card and the main section. Consequently, such constituent sections as an IC card holding mechanism and an IC card mounting and releasing section can be dispensed with and hence the structure is simplified, thereby stabilizing the electric connection and simplifying operation. With these advantages, the portable telephone set can be minimized in size and hence the cost thereof is reduced. Moreover, it is possible to prevent the IC card from falling from the battery pack 3 and from being lost.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A portable telephone set comprising;

a portable telephone casing; and a battery pack attachable to and detachable from the portable telephone casing, the battery pack includes an IC card holding means for holding an IC card, the battery pack and an IC card positioned in the IC card holding means capable of being attached to and detached from the portable telephone casing as a unit;

the battery pack includes a mounting side, with the mounting side being the side of the battery pack which is attachable to and detachable from the portable telephone casing, and the IC card holding means includes an L-shaped rib forming a slot and disposed towards an end of the battery pack on the mounting side thereof for receiving an IC card;

an IC card having a connector section, the portable telephone casing having a battery pack and IC card receiving section which includes an IC card surface positioned to be opposite the IC card when the battery pack and IC card as a unit is attached to the portable telephone casing, and a first connector disposed on the IC card surface of the portable telephone casing such that an electrical connection is established between the first connector and the connector section of the IC card when the battery pack and IC card are attached to the portable telephone casing; and the first connector includes a connector terminal, the connector terminal extends from the IC card surface of the portable telephone casing, is stationary thereto, and is biased toward the IC card.

* * * * *